United States Patent [19]
Hosoe

[11] Patent Number: 6,011,925
[45] Date of Patent: *Jan. 4, 2000

[54] IMAGE INPUT APPARATUS HAVING A PAN HEAD

[75] Inventor: Hiroshi Hosoe, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/861,937

[22] Filed: May 22, 1997

[30] Foreign Application Priority Data

May 24, 1996 [JP] Japan .................................. 8-130285

[51] Int. Cl.[7] ................................................ G03B 17/24
[52] U.S. Cl. .............................. 396/50; 396/427; 396/428
[58] Field of Search .............................. 396/50, 419, 427, 396/428

[56] References Cited

U.S. PATENT DOCUMENTS

| 4,794,417 | 12/1988 | Sekiguchi et al. | 396/427 |
|---|---|---|---|
| 5,045,872 | 9/1991 | Yoshimura et al. | 396/428 |
| 5,623,709 | 4/1997 | Kaji | 396/428 |

*Primary Examiner*—David M. Gray
*Attorney, Agent, or Firm*—Fitzpatrick, Cella, Harper & Scinto

[57] ABSTRACT

An image input apparatus includes a camera unit for converting image information from an optical system into an electrical signal and outputting the electrical signal, a pan head having a control mechanism for at least two axes, a sensor for detecting the attitude of the image input apparatus, and a controller for controlling the control mechanism of the pan head on the basis of the attitude of the image input apparatus detected by the sensor.

14 Claims, 9 Drawing Sheets

$\Psi t = -\theta 1 \cdot \cos(\Psi p - \theta 2)$ $\theta 1$: GRADIENT OF x AXIS TO HORIZONTAL
$\theta 2$: GRADIENT OF y AXIS TO HORIZONTAL
$\Psi p$: PAN OPERATION ANGLE
$\Psi t$: TILT OPERATION ANGLE

IMAGE INPUT APPARATUS HAVING A PAN HEAD

BACKGROUND OF THE INVENTION

1. Field of the Invention

The present invention relates an image input apparatus comprising an electric pan head, which pivotally supports a camera unit.

2. Related Background Art

FIG. 12 shows an example of an image input apparatus of this type. An image input apparatus 100 comprises a camera unit 101 and an electric pan head 102 for pivotally supporting the camera unit 101. According to this image input apparatus 100, the attitude of the camera unit can be controlled even from a distant place via remote control by, e.g., a remote controller, and such apparatus can be applied to a monitoring system, unmanned photographing system, and the like.

Most conventional electric pan heads allow rotations in two directions, i.e., in directions parallel to and perpendicular to their setting surfaces (the former operation will be referred to as panning hereinafter, and the latter operation will be referred to as tilting hereinafter). With this feature, in the case of the image input apparatus with the camera unit, nearly all the directions around the setting position of the image input apparatus can be photographed.

However, for example, when the setting place of the image input apparatus is not flat or is a plane inclined at a given angle from the horizontal plane, the setting surface of the electric pan head at that time is not parallel to the horizontal plane. For this reason, photographing is made while the setting surface is inclined. Also, for example, when an object that is moving on the horizontal plane is traced and photographed while moving the electric pan head, if the panning path of the camera unit is not parallel to the horizontal plane, the photographing operation may fail.

SUMMARY OF THE INVENTION

The present invention has been made in consideration of the above situation, and has as its object to provide an image input apparatus which can detect changes in attitude of the apparatus, and can always guarantee appropriate operations of the apparatus.

In order to achieve the above object, according to an aspect of the present invention, there is provided an image input apparatus comprising a camera unit for converting image information from an optical system into an electrical signal and outputting the electrical signal, a pan head having a control mechanism for at least two axes, a sensor for detecting an attitude of the image input apparatus, and a controller for controlling the control mechanism of the pan head on the basis of the attitude of the image input apparatus detected by the sensor.

According to another aspect, there is provided a pan head comprising a control mechanism for at least two axes, and a sensor for detecting an attitude of the pan head.

Other objects and features of the present invention will become apparent from the following specification and the accompanying drawings.

DETAILED DESCRIPTION OF THE PREFERRED EMBODIMENTS

The first embodiment of an image input apparatus according to the present invention will be explained below with reference to FIGS. 1 to 5.

Figure 1:
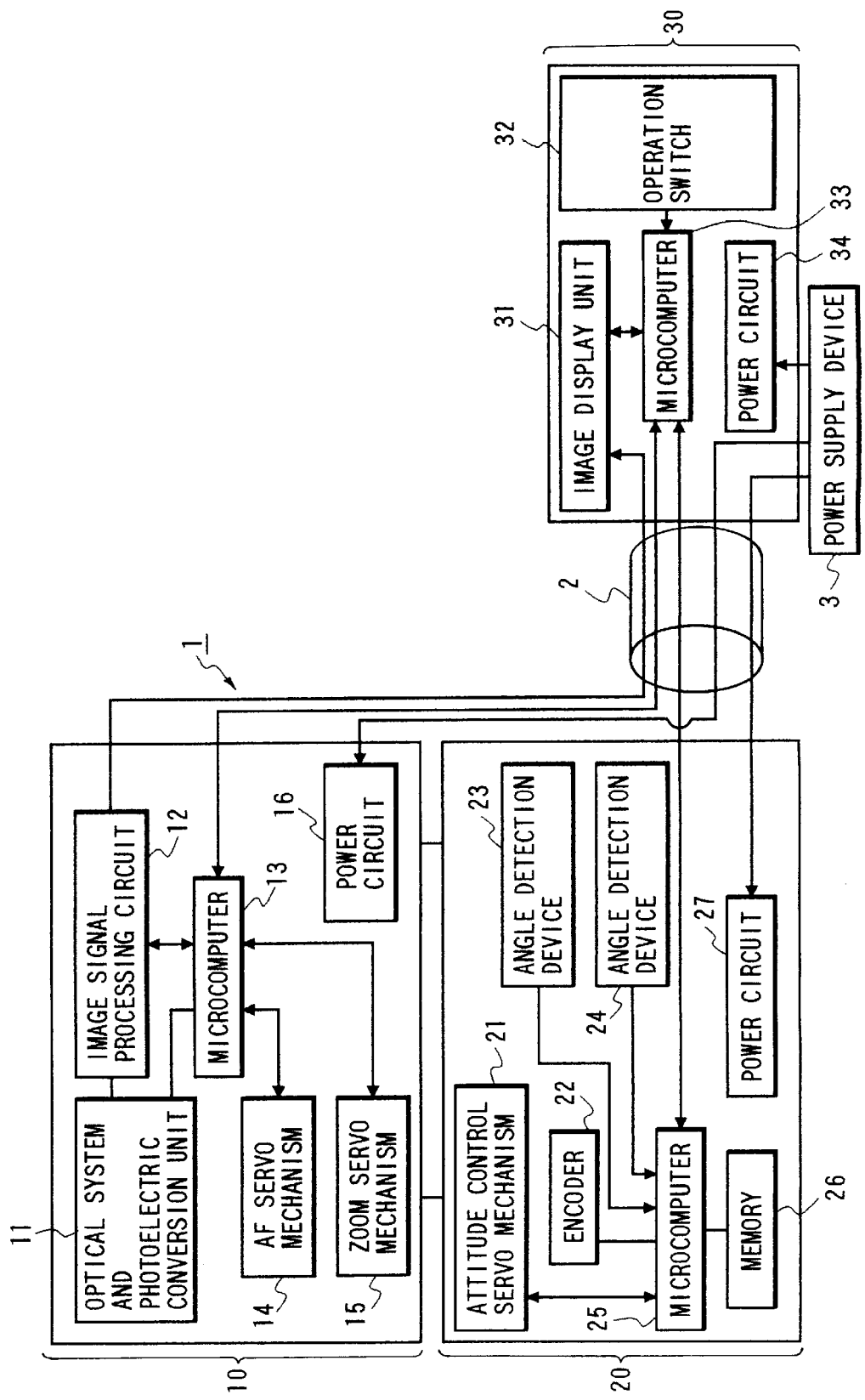
FIG. 1 is a block diagram showing the arrangement of the first embodiment of an image input apparatus according to the present invention.

FIG. 1 is a block diagram showing the preferred embodiment of an image input apparatus 1 according to the present invention. In this embodiment, a system is built by combining the apparatus 1 and a remote controller 30 with an image display unit 31.

Referring to FIG. 1, the image input apparatus 1 comprises a camera unit 10 and an electric pan head 20 for pivotally supporting the camera unit 10. The image input unit 1 and the remote controller 30 are electrically connected to each other via a cable 2.

The camera unit 10 comprises an optical system and photoelectric conversion unit 11, an image signal processing circuit 12, a microcomputer 13, an auto-focus (AF) servo mechanism 14, a zoom servo mechanism 15, and a power circuit 16.

The electric pan head 20 comprises an attitude control servo mechanism 21, an encoder 22, angle detection devices 23 and 24, a microcomputer 25, a memory 26, and a power circuit 27.

The remote controller 30 comprises the above-mentioned image display unit 31, operation switches 32, a microcomputer 33, and a power circuit 34.

The cable 2 interconnects these system constituting elements. For example, the cable 2 includes a control signal line for exchanging control signals, an image signal line for transmitting image information converted into an electrical signal by the camera unit 10 to the remote controller 30, and a power line for supplying electric power to the individual units of the system.

More specifically, the microcomputer 33 for controlling the remote controller 30, the microcomputer 13 for controlling the camera unit 10, and the microcomputer 25 for controlling the electric pan head 20 are connected to each other via the control signal line.

Also, the image signal processing circuit 12 of the camera unit 10, and the image display unit 31 of the remote controller 30 are connected to each other via the image signal line.

Furthermore, the power circuits 16, 27, and 34 in the camera unit 10, electric pan head 20, and remote controller 30, and a power supply device 3 are connected to each other via the power line.

The remote controller 30 has the operation switches 32 for operating the remote controller 30 itself, the camera unit 10, and the electric pan head 20. A signal generated upon operation of one of these operation switches 32 is temporarily input to the microcomputer 33 for controlling the remote controller 30. The microcomputer 33 supplies a control signal to the microcomputer 13 or 25 or controls driving of the image display unit 31 of the remote controller 30 in accordance with the contents of the input signal.

For example, when one of the switches 32 for operating the electric pan head 20 is operated, the output signal from the corresponding switch 32 is input to the microcomputer 33, which sends a control signal corresponding to the operation contents to the microcomputer 25. Upon reception of the control signal from the microcomputer 33, the microcomputer 25 controls driving of the attitude control servo mechanism 21 in accordance with the contents of the received control signal. When another one of the switches 32 for operating the focal length of the camera unit 10 is operated, the output signal from the corresponding switch 32 is input to the microcomputer 33, which sends a control signal corresponding to the operation contents to the microcomputer 13. Upon reception of the control signal from the microcomputer 33, the microcomputer 13 controls the zoom servo mechanism 15 in accordance with the contents of the received control signal.

Figure 2:
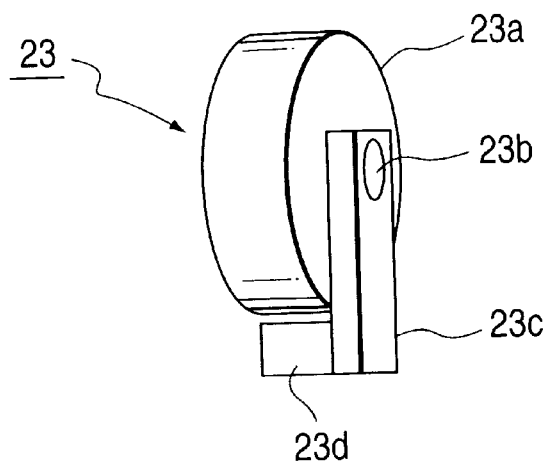
FIG. 2 is a perspective view showing the outer appearance of an angle detection device in the first embodiment of the image input apparatus according to the present invention.

FIG. 2 is a perspective view for explaining the structure of the angle detection devices 23 and 24 in this embodiment.

As shown in FIG. 2, the angle detection device 23 has an arrangement in which a weight 23d suspends from a shaft 23b of a volume 23a via an arm 23c. The same applies to the angle detection device 24. That is, the angle detection device 24 is correspondingly made up of a volume 24a, a shaft 24b, an arm 24c, and a weight 24d (not shown).

With this arrangement, even when the attitude of the angle detection device 23, i.e., the volume 23a itself, changes, the weight 23d is always located at the position immediately below the volume 23a by its inertia. For this reason, the shaft 23b of the volume 23a rotates, and the rotation angle at that time is detected a change in resistance of a variable resistor arranged in the volume 23a. In this embodiment, the angle detection devices 23 and 24 are attached to two positions in the image input apparatus (see FIG. 3).

Figure 4:
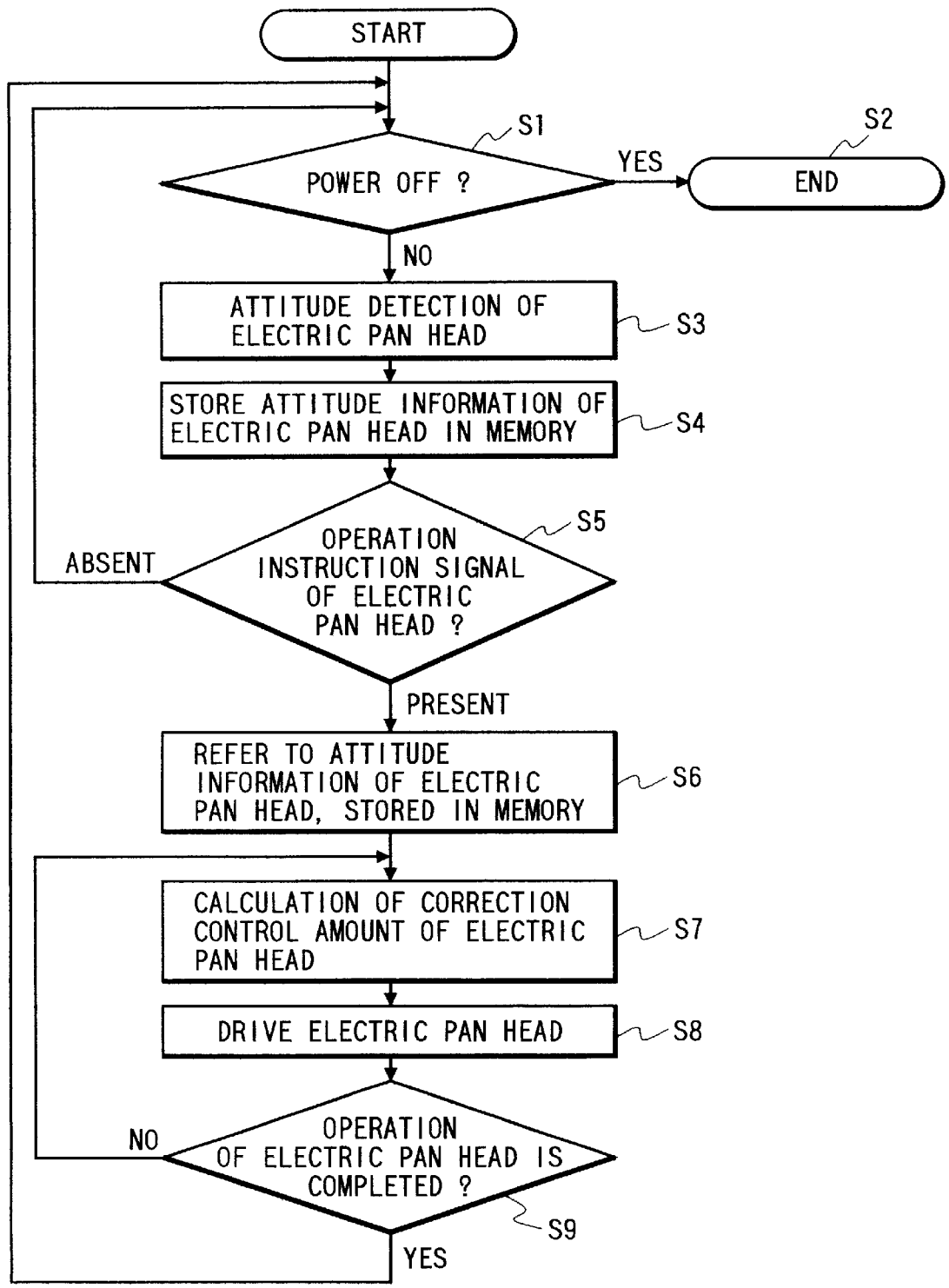
FIG. 4 is a flow chart for explaining the operation procedure in the first embodiment of the image input apparatus according to the present invention.
Figure 5:
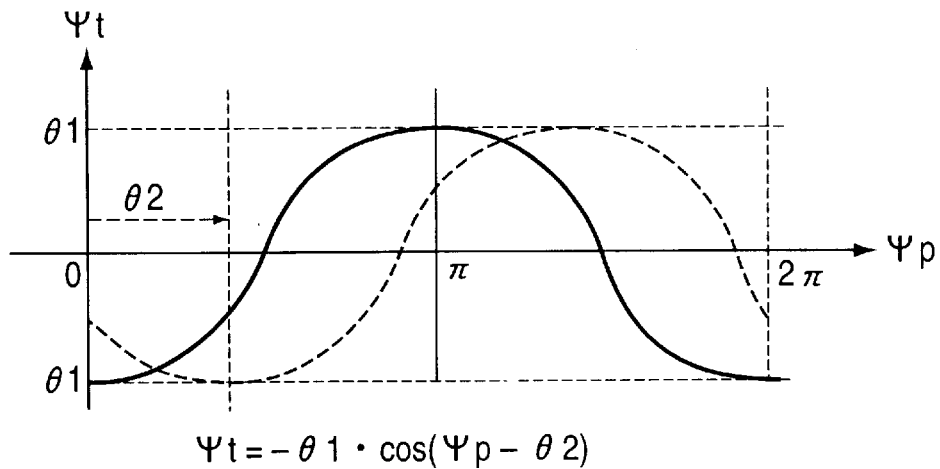
FIG. 5 is a graph for explaining the operation correction control of an electric pan head in the first embodiment of the image input apparatus according to the present invention.

FIG. 4 is a flow chart for explaining the operation procedure of the image input apparatus 1 in this embodiment. The operation procedure in this embodiment will be explained below with reference to FIG. 4.

Figure 3:
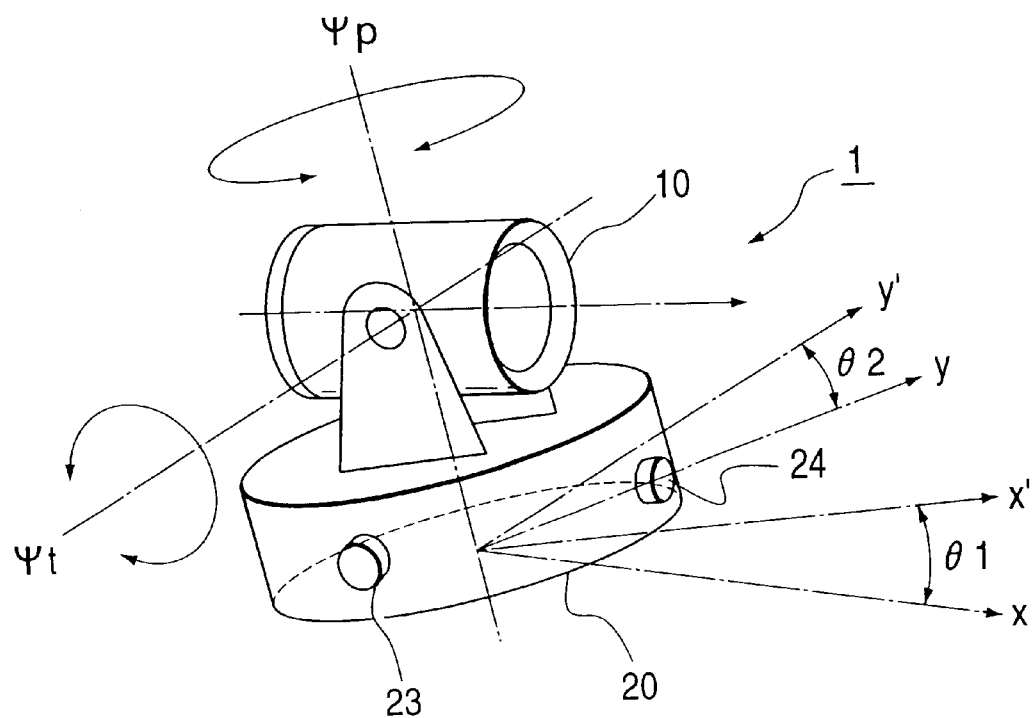
FIG. 3 is a perspective view showing the outer appearance of the first embodiment of the image input apparatus according to the present invention.

In the image input apparatus 1 with the angle detection devices 23 and 24, the electric pan head 20 is assumed to have two control axes, i.e., panning and tilting axes, as shown in FIG. 3. In FIG. 3, an x'-y' plane represents the bottom surface of the electric pan head 20, which surface serves as a reference plane of the electric pan head 20. Also, an x-y plane represents the horizontal plane, and the x-y and x'-y' planes have a common origin.

Referring to FIG. 4, the ON/OFF state of the power device is checked (step S1). If the power device is OFF, the processing ends (step S2); otherwise, the attitude of the electric pan head 20 is detected (step S3). The attitude is detected as follows. The two angle detection devices 23 and 24 are attached to the electric pan head 20, as described above, so that the angle detection device 23 detects the rotation angle about a y'-axis, and the angle detection device 24 detects the rotation angle about an x'-axis.

The angle detection devices 23 and 24 are respectively connected to the microcomputer 25, as shown in FIG. 1, and the output signals from these angle detection devices 23 and 24 are input to and processed by the microcomputer 25. Then, the processed output signals are stored as attitude information of the electric pan head 20 in the memory 26 connected to the microcomputer 25 (step S4), as shown in FIG. 1. The output signals from the angle detection devices 23 and 24 are sampled and input to the microcomputer 25 at predetermined intervals while the electric pan head 20 is not operated, and are stored in the memory 26.

It is then checked if an operation instruction signal of the electric pan head 20 is input to the microcomputer 25 at a certain timing (step S5). If an operation instruction signal is input, the microcomputer 25 refers to the attitude information of the electric pan head 20 stored in the memory 26 (step S6), and calculates the correction amounts of the attitude of the camera unit 10 on the basis of this attitude information, and the output signals from the encoder 22, which is arranged in the attitude control servo mechanism 21 of the electric pan head 20 shown in FIG. 1 so as to detect a pan angle ψp and a tilt angle ψt (step S7). Then, the microcomputer 25 controls the operation of the electric pan head 20 in accordance with the calculated correction amounts (step S8). The operations in steps S7 and S8 are repeated until the operation instruction for the electric pan head 20 ends (step S9).

The operation correction of the electric pan head 20 will be described in detail below while taking panning as an example.

Assume that the electric pan head 20 has rotated by an angle θ1 about the y'-axis and by an angle θ2 about the x'-axis with respect to the horizontal plane as a result of detection of the attitude of the electric pan head 20 by the angle detection devices 23 and 24. The microcomputer 25 receives information of these angles θ1 and θ2, and stores their contents in the memory 26.

A case will be examined below wherein the reference plane (x'-y' plane) of the electric pan head 20 has rotated by the angle θ1 about the y-axis alone. In this case, the distal end of the camera unit 10 vertically moves to draw a cosine curve for one cycle during panning for one round, when viewed from the horizontal plane (x-y plane). In order to absorb this vertical movement, when the tilt angle ψt is controlled in correspondence with the pan angle ψp, as indicated by the solid curve in FIG. 5, the operation path of the camera unit 10 during panning can be corrected to be set on a plane parallel to the horizontal plane.

Furthermore, when the reference plane of the electric pan head 20 has rotated by the angle θ2 about the x-axis at the same time, the phase of the above-mentioned cosine curve drawn by the distal end of the camera unit 10 shifts in correspondence with the angle θ2 from that in the case wherein the reference plane (x'-y' plane) of the electric pan head 20 has rotated by the angle θ1 about the y-axis alone. Therefore, when the attitude correction amount (tilt angle ψt) of the camera unit 10 is controlled while shifting the phase by the angle θ2 with respect to the pan angle ψp, as indicated by the broken curve in FIG. 5, the operation path of the camera unit 10 during panning can be corrected to be set on a plane parallel to the horizontal plane.

As for the correction of the operation path upon tilting, when the pan angle ψp is correction-controlled in correspondence with the tilt angle ψt, the operation path of the camera unit 10 during tilting can also be corrected to be set on a plane perpendicular to the horizontal plane.

The second embodiment of an image input apparatus according to the present invention will be described below.

Figure 7:
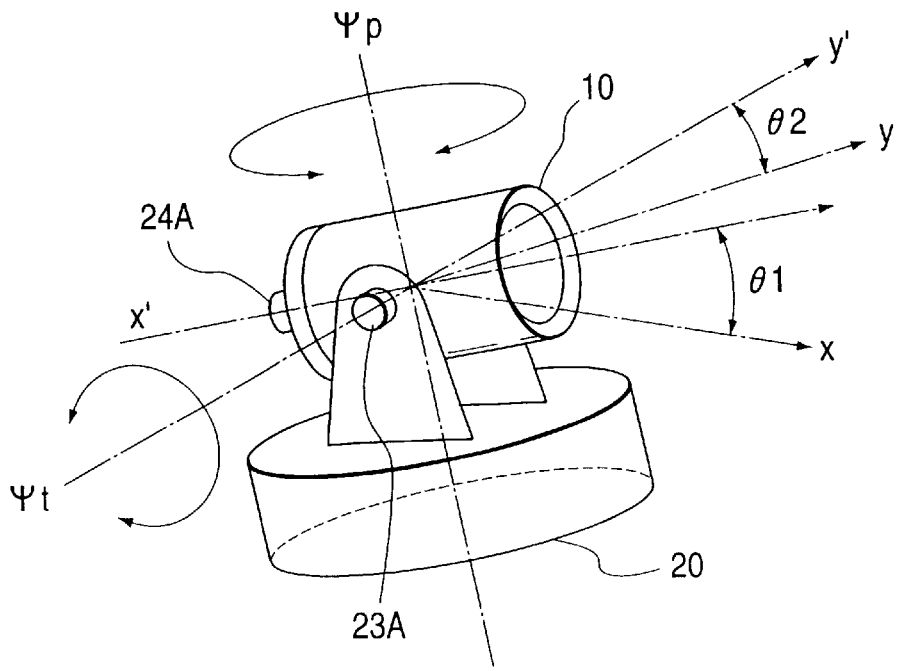
FIG. 7 is a perspective view showing the outer appearance of the second embodiment of the image input apparatus according to the present invention.
Figure 6:
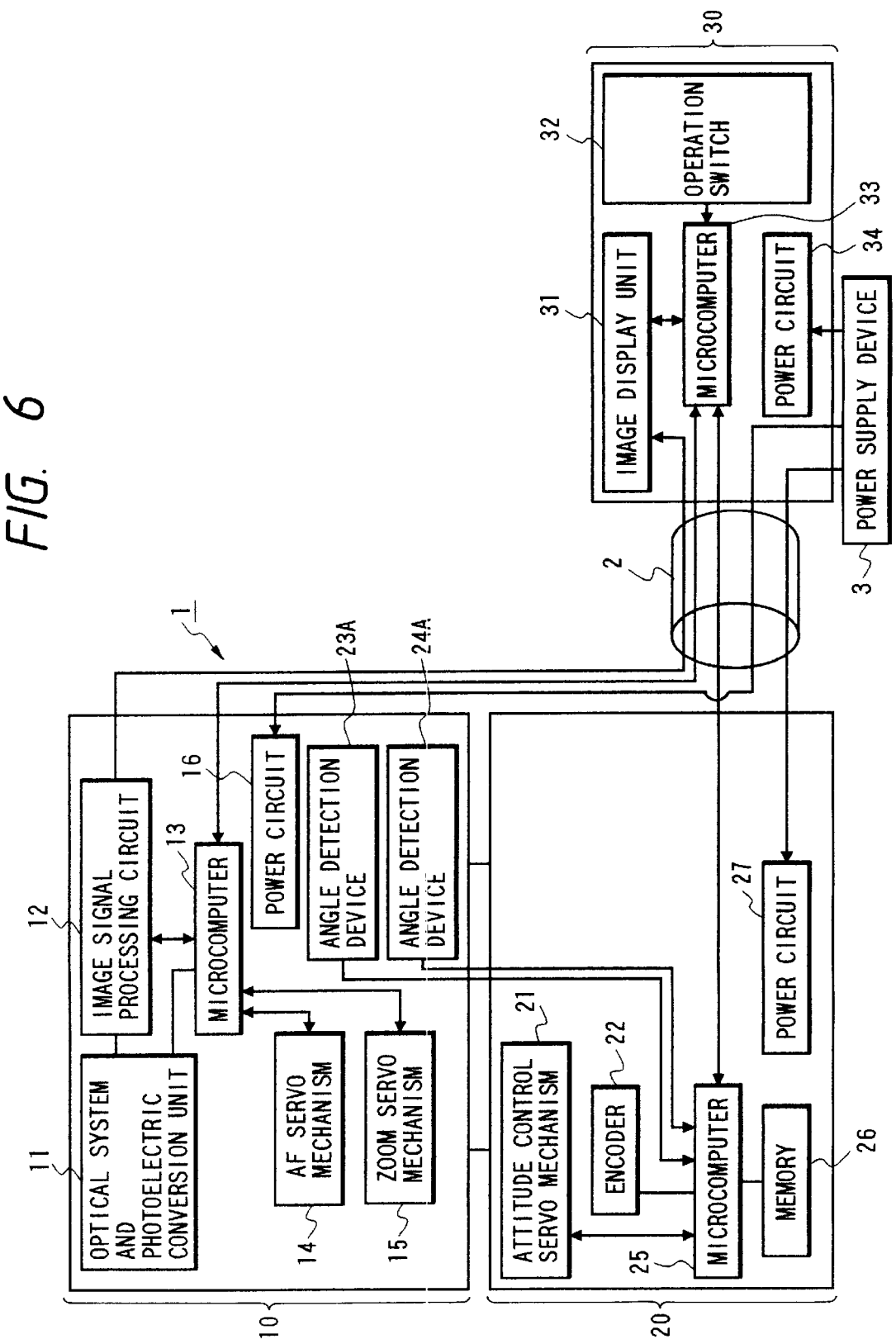
FIG. 6 is a block diagram showing the arrangement of the second embodiment of an image input apparatus according to the present invention.

FIG. 6 shows the arrangement of a system in which an image input apparatus 1 in this embodiment is combined with a remote controller 30 with an image display unit 31. In this embodiment, especially, a camera unit 10 comprises angle detection devices 23A and 24A. The arrangement of the angle detection device 23A or 24A itself is the same as that in the first embodiment described above. These angle detection devices 23A and 24A are attached to appropriate positions of the camera unit 10, as shown in FIG. 7. Also, the basic arrangement of the image input apparatus 1 is substantially the same as that of the first embodiment.

Figure 8:
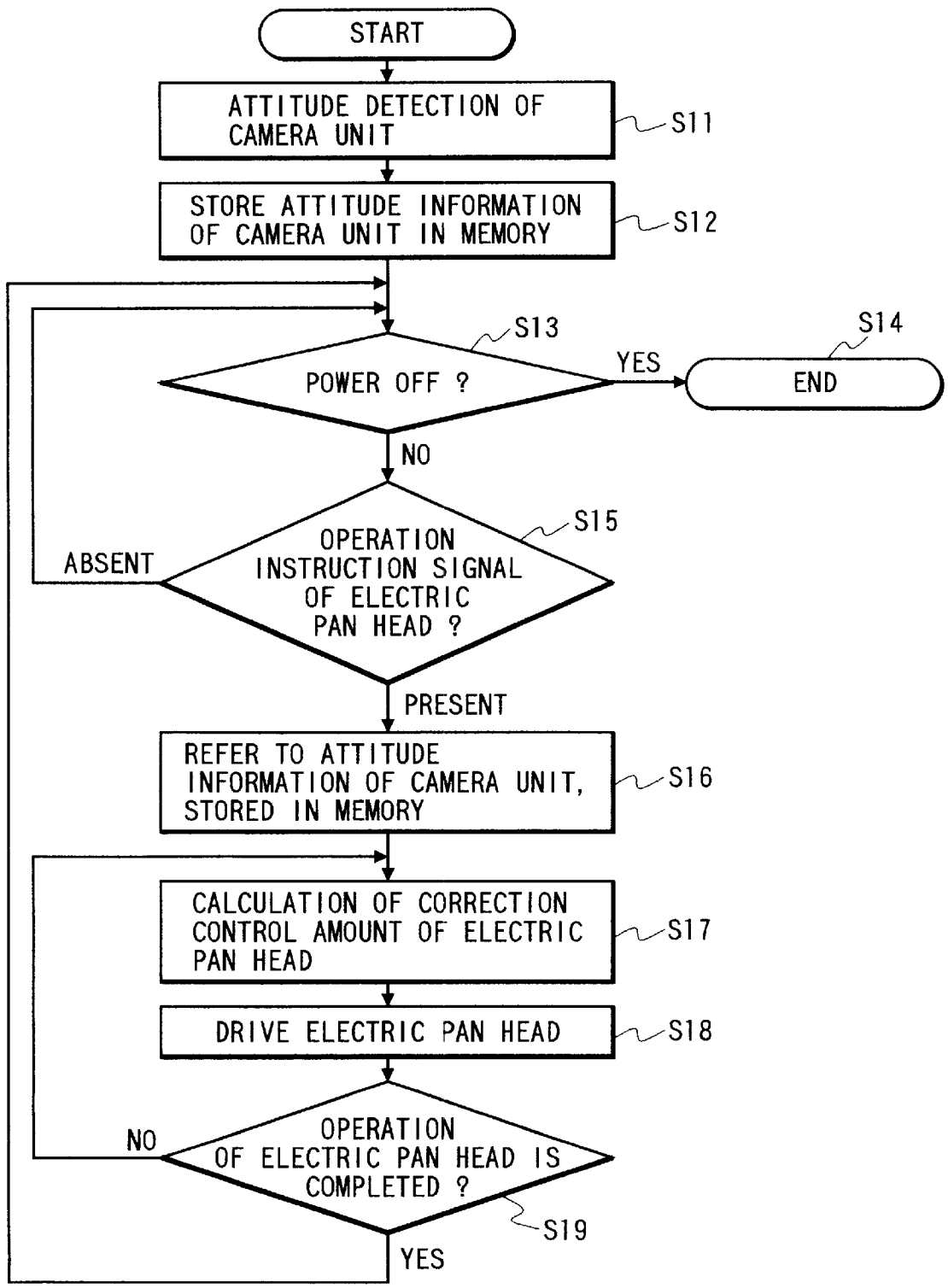
FIG. 8 is a flow chart for explaining the operation procedure in the second embodiment of the image input apparatus according to the present invention.

FIG. 8 is a flow chart for explaining the operation procedure of the image input apparatus 1 in this embodiment. The operation procedure in this embodiment will be described below with reference to FIGS. 7 and 8.

In FIG. 7, an x'-axis represents the optical axis of the camera unit 10, and a y'-axis is perpendicular to the x'-axis. An x'-y' plane serves as the reference plane of the camera unit 10, and an x-y plane represents the horizontal plane. The x-y and x'-y' planes have a common origin.

Also, in FIG. 7, the angle detection device 23A is attached to be able to detect rotations about the y'-axis, and the angle detection device 24A is attached to be able to detect rotations about the x'-axis.

In this embodiment, when a pan angle ψp of an electric pan head 20 is zero, and its tilt angle ψt is zero (this attitude of the electric pan head 20 will be referred to as an initial attitude hereinafter), the angle detection devices 23A and 24A detect the attitude of the camera unit 10 (step S11). The detection results are output to a microcomputer 25, which stores their contents in a memory 26 (step S12). The initial attitude of the electric pan head 20 can be detected based on the output from an encoder 22 attached to an attitude servo mechanism 21 of the electric pan head 20. Note that the information stored in the memory 26 is held unless it is deleted or changed by user's operations.

Subsequently, the ON/OFF state of the power device is checked (step S13). If the power device is OFF, the processing ends (step S14); otherwise, it is checked if an operation instruction signal of the electric pan head 20 is input to the microcomputer 25 from the remote controller 30 at a certain timing (step S15). If an operation instruction signal is input, the microcomputer 25 refers to the attitude information of the electric pan head 20 stored in the memory 25 (step S16), and calculates the correction amounts of the attitude of the camera unit 10 on the basis of this attitude information, and the output signals from the encoder 22, which is arranged in the attitude control servo mechanism 21 of the electric pan head 20 shown in FIG. 6 so as to detect the pan angle ψp and the tilt angle ψt (step S17). Then, the microcomputer 25 controls the operation of the electric pan head 20 in accordance with the calculated correction amounts (step S18). The operations in steps S17 and S18 are repeated until the operation instruction for the electric pan head 20 ends (step S19).

The operation correction of the electric pan head 20 will be described in detail below while taking panning as an example.

When the electric pan head 20 has rotated by an angle θ1 about the y'-axis and by an angle θ2 about the x'-axis with respect to the horizontal plane, as shown in FIG. 7, as a result of detection of the attitude of the camera unit 10 by the angle detection devices 23A and 24A at the initial attitude of the electric pan head 20, the microcomputer 25 receives information of these angles θ1 and θ2, and stores their contents in the memory 26.

A case will be examined below wherein the reference plane (x'-y' plane) of the camera unit 10 has rotated by the angle θ1 about the y-axis alone. In this case, the distal end of the camera unit 10 vertically moves to draw a cosine curve for one cycle during panning for one round, when viewed from the horizontal plane (x-y plane). In order to absorb this vertical movement, when the tilt angle ψt is controlled in correspondence with the pan angle ψp, as indicated by the solid curve in FIG. 5 described in the first embodiment, the operation path of the camera unit 10 during panning can be corrected to be set on a plane parallel to the horizontal plane.

Furthermore, when the reference plane of the camera unit 10 has rotated by the angle θ2 about the x-axis at the same time, the phase of the above-mentioned cosine curve drawn by the distal end of the camera unit 10 shifts in correspondence with the angle θ2 from that in the case wherein the reference plane (x'-y' plane) of the electric pan head 20 has rotated by the angle θ1 about the y-axis alone. Therefore, when the attitude correction amount (tilt angle ψt) of the camera unit 10 is controlled while shifting the phase by the angle θ2 with respect to the pan angle ψp, as indicated by the broken curve in FIG. 5 described in the first embodiment, the operation path of the camera unit 10 during panning can be corrected to be set on a plane parallel to the horizontal plane.

As for the correction of the operation path upon tilting, when the pan angle ψp is correction-controlled in correspondence with the tilt angle ψt, the operation path of the camera unit 10 during tilting can also be corrected to be set on a plane perpendicular to the horizontal plane.

The third embodiment of an image input apparatus according to the present invention will be described below.

Figure 9:
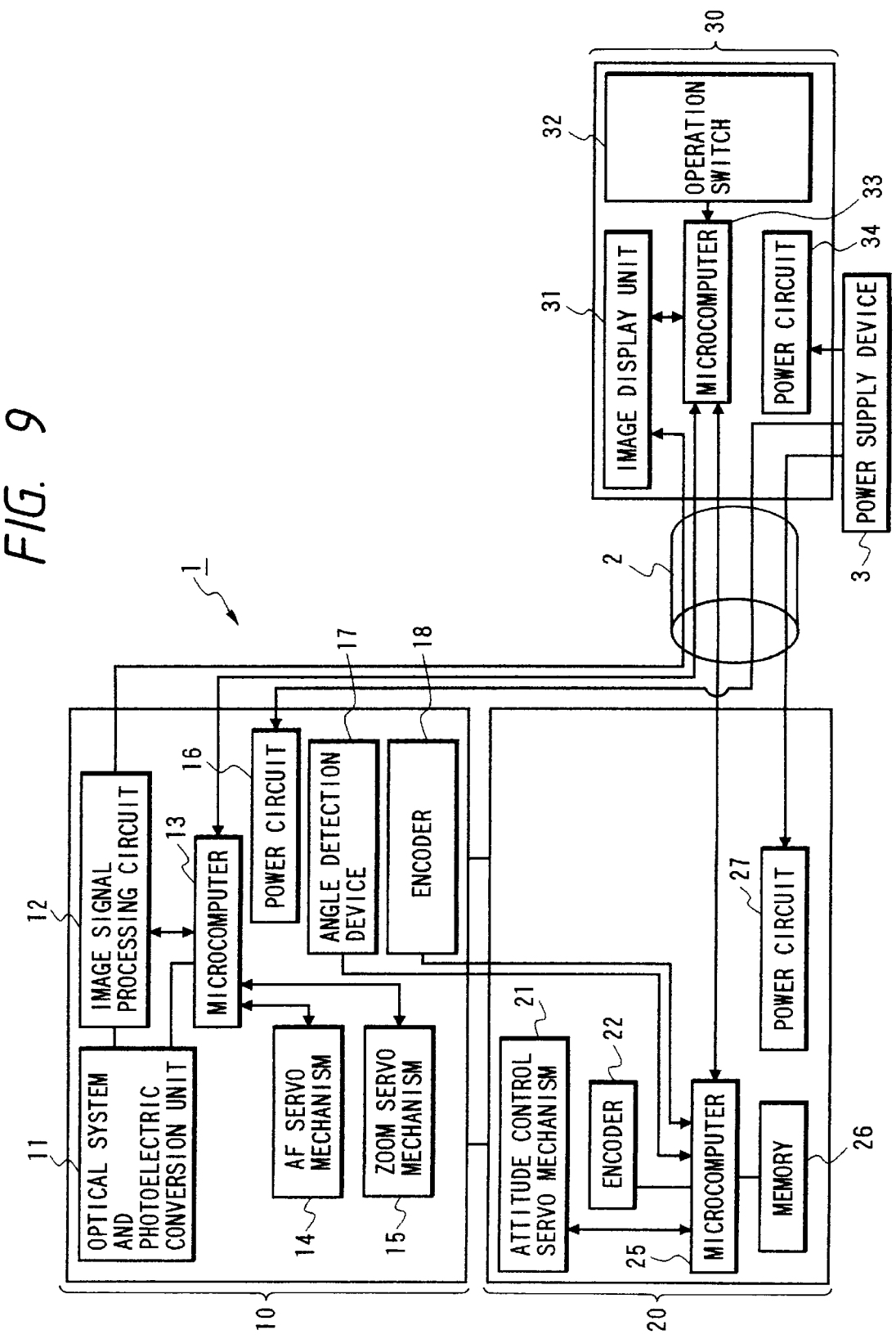
FIG. 9 is a block diagram showing the arrangement of the third embodiment of an image input apparatus according to the present invention.

FIG. 9 shows the arrangement of a system in which an image input apparatus 1 in this embodiment is combined with a remote controller 30 with an image display unit 31. In this embodiment, a camera unit 10 comprises an angle detection device 17 and an encoder 18. Especially, as will be described later, the encoder 18 and a ring member 19 (FIG. 10) make up an angle detection device for one direction. The arrangement of such angle detection device is the same as that in the first embodiment described above. Also, the basic arrangement of the image input apparatus 1 is substantially the same as that of the first embodiment.

Figure 10:
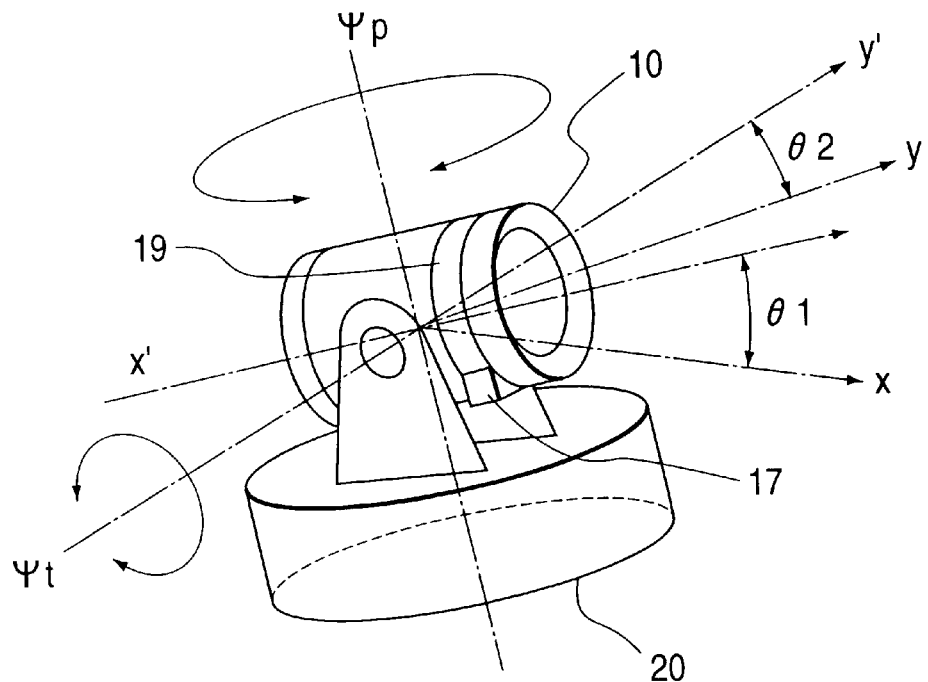
FIG. 10 is a perspective view showing the outer appearance of the third embodiment of the image input apparatus according to the present invention.
Figure 12:
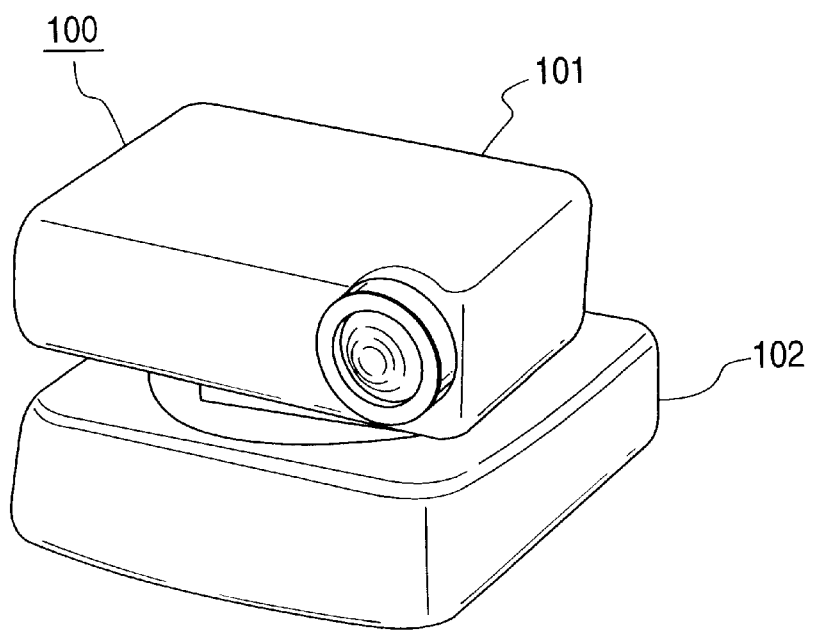
FIG. 12 is a perspective view showing the outer appearance of a conventional image input apparatus.

As shown in FIG. 10, the camera unit 10 has the ring member 19 which is slidably attached to a camera lens barrel. The encoder 18 is set in the camera unit 10 to be able to detect the rotation amount of the ring member 19. The angle detection device 17 and the weight (not shown) are attached on the same position in the outer circumference of the ring member 19. The encoder 18 can detect a rotation angle θ2 of the ring member 19 about the optical axis (x'-axis) of the camera unit 10, because the ring member 19 rotates by the inertia of the weight so that the angle detection device 17 and the weight are always located at the position immediately below the camera unit 10. The angle detection device 17 attached to the lower end of the ring member 19 can detect a rotation angle θ1 about a y'-axis of the camera unit 10.

Figure 11:
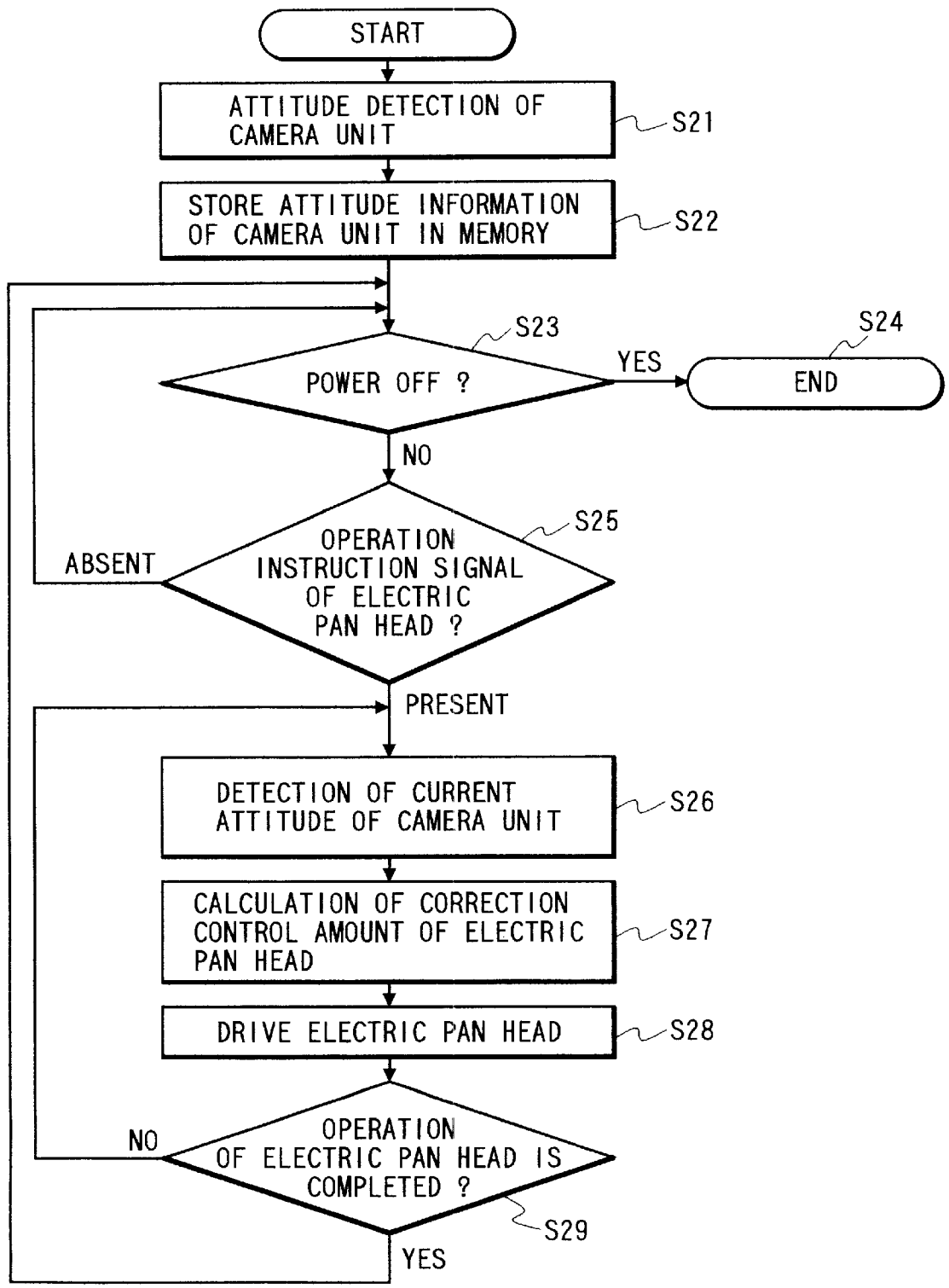
FIG. 11 is a flow chart for explaining the operation procedure in the third embodiment of the image input apparatus according to the present invention.

FIG. 11 is a flow chart for explaining the operation procedure of the image input apparatus 1 in this embodiment. The operation procedure in this embodiment will be described below with reference to FIGS. 10 and 11.

In FIG. 10, an x'-axis represents the optical axis of the camera unit 10, and a y'-axis is perpendicular to the x'-axis. An x'-y' plane serves as the reference plane of the camera unit 10, and an x-y plane represents the horizontal plane. The x-y and x'-y' planes have a common origin.

In this embodiment, an initial angle θ1' about the y'-axis of the camera unit 10, and an initial angle θ2' about the x'-axis are detected in advance (step S21), and are stored in a memory 26 (step S22).

Subsequently, the ON/OFF state of the power device is checked (step S23). If the power device is OFF, the processing ends (step S24); otherwise, it is checked if an operation instruction signal of an electric pan head 20 is input to a microcomputer 25 at a certain timing (step S25). If an operation instruction signal is input, the microcomputer 25 detects the current angle θ1 about the y'-axis of the camera 10 and the current angle θ2 about the x'-axis all the time while it controls an attitude control servo mechanism 21 of the electric pan head 20 to operate the electric pan head 20 (step S26). Then, the microcomputer 25 compares the current angles θ1 and θ2 with the previous angles θ1' and θ2' stored in the memory 26, and calculates correction control amounts between these angles (step S27). The microcomputer 25 then performs operation correction control of the electric pan head 20 based on the correction control amounts to compensate for the angle differences, thereby correcting the attitude of the camera unit 10 (step S28). The operations in steps S26, S27, and S28 are repeated until the operation instruction for the electric pan head 20 ends (step S29).

For example, during panning, the angle θ1 detected by the angle detection device 17 is compared with the previous angle θ1', and a tilt angle ψt is corrected by their difference (θ1-θ1') in accordance with output of the encorder 22, thereby holding the panning path of the camera unit 10 on a plane parallel to the horizontal plane. Also, during tilting, the angle θ2 detected by the encoder 18 is compared with the previous angle θ2', and a pan angle ψp is corrected by their difference (θ2-θ2') in accordance with output of the encorder 22, thereby holding the tilting path of the camera unit 10 on a plane perpendicular to the horizontal plane.

As described above, according to the above embodiments, the setting attitude of the image input apparatus can be detected as a gradient angle from the horizontal plane, and the control amount of the electric pan head is changed on the basis of the attitude of the image input apparatus, so that the panning path is present on a plane parallel to the horizontal plane, and the tilting path is present on a plane perpendicular to the horizontal plane, thus improving the operability of panning and tilting of the image input apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus that controls movement of an imaging direction in response to an externally supplied control command, said image input apparatus comprising:
   a camera unit that converts optical image information into an electrical signal and outputs the electrical signal;
   a pan head having a control mechanism that controls movement of the camera unit in at least two axes of said pan head;
   detection means for detecting respective directions of said at least two axes relative to a reference;
   correction means for correcting a control command on the basis of the respective directions of said at least two axes detected by said detecting means; and
   control means for controlling the control mechanism of said pan head on the basis of a control command corrected by said correction means.

2. An apparatus according to claim 1, wherein said detection means detects a gradient of a reference plane of said pan head relative to a horizontal plane.

3. An apparatus according to claim 2, wherein said detection means is attached to said pan head.

4. An apparatus according to claim 1, wherein said detection means is attached to said pan head.

5. An apparatus according to claim 1, wherein said control means controls the control mechanism of said pan head to automatically control movement of the camera unit on an arbitrary one of said at least two axes of said pan head in cooperation with control of a panning movement on the other one of said at least two axes of said pan head on the basis of the control command corrected by said correction means.

6. An apparatus according to claim 5, wherein a default position control reference of the arbitrary one of said at least two axes of said control means is the apparent horizontal plane.

7. An apparatus according to claim 6, wherein the arbitrary one of said at least two axes is a panning axis.

8. An apparatus according to claim 6, wherein the arbitrary one of said at least two axes is a tilting axis.

9. An apparatus according to claim 1, further comprising a memory that stores attitude information of said image input apparatus according to the respective directions of said at least two axes detected by said detection means.

10. A pan head that controls movement of an imaging direction of a camera unit in response to an externally supplied control command, said pan head comprising:
    a control mechanism that controls movement of the camera unit on at least two axes of the pan head;
    detection means for detecting respective directions of said at least two axes relative to a reference;
    correction means for correcting a control command on the basis of the respective directions of said at least two axes detected by said detection means; and
    control means for controlling said control mechanism on the basis of a control command corrected by said correction means.

11. A pan head according to claim 10, wherein said detection means detects a gradient of a reference plane of said pan head relative to a horizontal plane.

12. An image input apparatus that controls movement of an imaging direction in response to an externally supplied control command, said image input apparatus comprising:
    a camera unit that converts optical image information into an electrical signal and outputs the electrical signal;

a pan head having a control mechanism that controls movement of the camera unit in at least two axes;

detection means for detecting whether or not an initial position of said camera unit is parallel to a reference plane;

correction means for correcting a control command on the basis of a detection result of said detecting means; and control means for controlling the control mechanism of said pan head on the basis of a control command corrected by said correction means.

13. An apparatus according to claim 12, wherein said detection means is attached to said camera unit.

14. An apparatus according to claim 12, wherein said detection means detects a gradient of said camera unit relative to said reference plane.

* * * * *

UNITED STATES PATENT AND TRADEMARK OFFICE
CERTIFICATE OF CORRECTION

PATENT NO. : 6,011,925

DATED : January 4, 2000

INVENTOR(S): HIROSHI HOSOE

It is certified that error appears in the above-identified patent and that said Letters Patent is hereby corrected as shown below:

<u>Column 10</u>

Line 7, insert Claims 15 and 16 as follows:

--15. A control method for an image input apparatus including a camera unit and a pan head having a control mechanism that controls movement of the camera unit in at least two axes of the pan head, comprising:
 a detection step of detecting respective directions of said at least two axes of the pan head relative to a reference;
 a processing step of setting a control amount of the movement of the camera unit in each of said at least two axes of the pan head on the basis of the respective directions of said at least two axes detected in said detection step and a control command for controlling said at least two axes of the pan head; and
 a control step of controlling the control mechanism of the pan head on the basis of the control amount of the movement of the camera unit set in said processing step for each of said at least two axes.

UNITED STATES PATENT AND TRADEMARK OFFICE
CERTIFICATE OF CORRECTION

PATENT NO. : 6,011,925

DATED : January 4, 2000

INVENTOR(S): HIROSHI HOSOE

It is certified that error appears in the above-identified patent and that said Letters Patent is hereby corrected as shown below:

16. A control method for an image input apparatus including a camera unit and a pan head having a control mechanism that controls movement of the camera unit in at least two axes of the pan head, comprising:
 a detection step of detecting whether or not an initial position of the camera unit is parallel to a reference plane;
 a processing step of setting a control amount of the movement of the camera unit in each of said at least two axes on the basis of a detection result in said detection step and a control command for controlling said at least two axes of the pan head; and
 a control step of controlling the control mechanism of the pan head on the basis of the control amount of the movement of the camera unit set in said processing step for each of said at least two axes.--

Signed and Sealed this

Twentieth Day of February, 2001

Attest:

NICHOLAS P. GODICI

Attesting Officer

Acting Director of the United States Patent and Trademark Office